United States Patent [19]
Jeffrey et al.

[11] Patent Number: 6,021,015
[45] Date of Patent: Feb. 1, 2000

[54] METHOD AND CIRCUIT FOR DRIVING HARD DISK DRIVE SPINDLE AND ACTUATOR MOTORS

[75] Inventors: Edward N. Jeffrey; William R. Krenik, both of Garland; David Cotton; Dennis V. Hahn, both of Plano; Shaibal Barua; Roy C. Jones, III, both of Dallas, all of Tex.

[73] Assignee: Texas Instruments Incorporated, Dallas, Tex.

[21] Appl. No.: 08/861,251

[22] Filed: May 21, 1997

Related U.S. Application Data

[60] Provisional application No. 60/019,098, Jun. 3, 1996.

[51] Int. Cl.$^7$ .................................................. G11B 15/18
[52] U.S. Cl. ........................ 360/69; 360/73.01; 360/78.12
[58] Field of Search ............................... 360/78.13, 78.04, 360/73.03, 75, 69, 73.01, 67, 70; 318/254, 770

[56] References Cited

U.S. PATENT DOCUMENTS

| | | | |
|---|---|---|---|
| 3,483,457 | 12/1969 | Ferlig et al. | 318/138 |
| 3,518,516 | 6/1970 | Pawletko | 318/138 |
| 3,601,678 | 8/1971 | Abraham et al. | 318/685 |
| 4,172,050 | 10/1979 | Gessell | 252/431 |
| 4,250,435 | 2/1981 | Alley et al. | 318/138 |
| 4,295,085 | 10/1981 | Lafuze | 318/721 |
| 4,394,610 | 7/1983 | Dolland | 318/803 |
| 4,401,934 | 8/1983 | Dolland et al. | 318/798 |
| 4,928,043 | 5/1990 | Plunkett | 318/254 |
| 5,091,680 | 2/1992 | Palm | 318/368 |
| 5,297,024 | 3/1994 | Carobolante | 360/67 |
| 5,327,053 | 7/1994 | Mann et al. | 318/254 |
| 5,329,412 | 7/1994 | Stefansky | 360/97.01 |
| 5,384,524 | 1/1995 | Romano | 360/75 X |
| 5,396,384 | 3/1995 | Caldeira et al. . | |
| 5,426,354 | 6/1995 | Bausch | 318/254 |
| 5,491,395 | 2/1996 | Hutsell et al. . | |
| 5,530,326 | 6/1996 | Galvin et al. | 318/254 |
| 5,606,468 | 2/1997 | Kodama | 360/75 |
| 5,767,653 | 6/1998 | DeFiore et al. | 318/770 X |

FOREIGN PATENT DOCUMENTS

WO 94/29852  12/1994  WIPO .
WO 95/02247   1/1995  WIPO .

OTHER PUBLICATIONS

U.S. application No. 08/919,867, Jeffrey, filed Aug. 28, 1997.
U.S. application No. 08/721,776, Hahn, filed Sep. 25, 1996.
U.S. application No. 09/004,399, Chloupek, et al., filed Jan. 8, 1998.

*Primary Examiner*—Aristotelis M. Psitos
*Assistant Examiner*—K. Wong
*Attorney, Agent, or Firm*—W. Daniels Swayze, Jr.; Wade James Brady, III; Richard L. Donaldson

[57] ABSTRACT

A system for driving hard disk drive spindle and actuator motors is disclosed. The system comprises a spindle motor control circuit (120), a spindle motor power circuit (210), an actuator motor control circuit (110), and an actuator motor power circuit (210). The spindle motor control circuit (120) and the actuator motor control circuit (110) are formed on a first substrate (100). The spindle motor power circuit (210) and the actuator motor power circuit (220) are formed on a second substrate (200). The system also includes at least one disk (22) attached to a rotatable spindle (21), a spindle motor (400) for receiving and being energized by the spindle motor power signals, and for controlling the rotation of the spindle (21), a plurality of disk read heads (12) adjacent to the disks (22), and an actuator motor (300) for receiving and being energized by the actuator motor power signals, and for controlling the position of the disk read heads (12).

17 Claims, 2 Drawing Sheets

METHOD AND CIRCUIT FOR DRIVING HARD DISK DRIVE SPINDLE AND ACTUATOR MOTORS

This application claims benefit of personal application Ser. No. 60/019,098 filed Jun. 3, 1996.

BACKGROUND OF THE INVENTION

A hard disk drive generally includes a stack of rotating disks or platters, a spindle motor which causes the disks to rotate, read/write heads which fly above the surface of the disks, an actuator motor (known as a "voice coil motor" or VCM) which controls the positioning of the read/write heads, power circuitry to provide electrical power to the spindle and voice coil motors, and control circuitry to control the operation of the spindle and voice coil motors.

For any particular type of computer, such as the line of computers incorporating Intel 80X86 microprocessors, a variety of compatible disk drives are typically offered. These disk drives may vary in the amount of memory available, the number of disks or platters in the stack, and the rate at which data can be written to or read from the disks. The power and control circuitry required to drive the spindle and voice coil motors for the disk drive generally varies with the parameters of the disk drive.

In the past, manufacturers of hard disk drive electronics have designed the motor power and control circuitry as four separate integrated circuit (IC) chips: a voice coil motor power chip, a voice coil motor control chip, a spindle motor power chip, and a spindle motor control chip. Each of these chips might vary from one disk drive type to another. Thus, one disk drive type might require four IC chips which are all different from those of another disk drive type.

Another prior art device integrated the actuator motor power and control circuits on one integrated circuit, and the spindle motor power and control circuits on another integrated circuit. Since the power portion of each chip would vary with the type of actuator and spindle motors used, different chips would be required to drive different motors.

Because integrated circuit chips are expensive to design and manufacture, it would be desirable to reduce the total number of chips used to provide disk drive motor power and control. Moreover, it would be advantageous if one or more of the chips providing power and control to the disk drive motors could be used in several different types of disk drives.

SUMMARY OF THE INVENTION

A method for driving hard disk drive spindle and actuator motors is disclosed. The method comprises the steps of (1) generating actuator motor control signals at an actuator control circuit formed on a first substrate; (2) generating spindle motor control signals at a spindle control circuit formed on the first substrate; (3) receiving the actuator motor control signals at an actuator power circuit formed on a second substrate, and generating actuator motor power signals; and (4) receiving the spindle motor control signals at a spindle power circuit formed on the second substrate, and generating spindle motor power signals.

A circuit for driving hard disk drive spindle and actuator motors in accordance with the invention comprises (1) a spindle motor control circuit formed on a first substrate, for generating a plurality of spindle motor control signals; (2) a spindle motor power circuit formed on a second substrate, for receiving the spindle motor control signals and for generating a plurality of spindle motor power signals; (3) an actuator motor control circuit formed on the first substrate, for receiving a linear current command signal and for generating a plurality of actuator motor control signals; (4) an actuator motor power circuit formed on the second substrate, for receiving the actuator motor control signals and for generating a plurality of actuator motor power signals; (5) at least one disk attached to a rotatable spindle, the disk having a magnetic medium for storing data; (6) a spindle motor for receiving and being energized by the spindle motor power signals, and for controlling the rotation of the spindle; (7) a plurality of disk read heads adjacent to the disks; and (8) an actuator motor for receiving and being energized by the actuator motor power signals, and for controlling the position of the disk read heads.

A technical advantage of the present invention is that a method and system for driving hard disk drive spindle and actuator motors is provided. Another technical advantage is that the invention requires only two integrated circuits. Another technical advantage is that the same generic control integrated circuit can be used in conjunction with a variety of power integrated circuits. Another technical advantage is that either pulse width modulation or linear current control can be selected for controlling the rotation speed of the spindle motor.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE INVENTION

Figure 1:
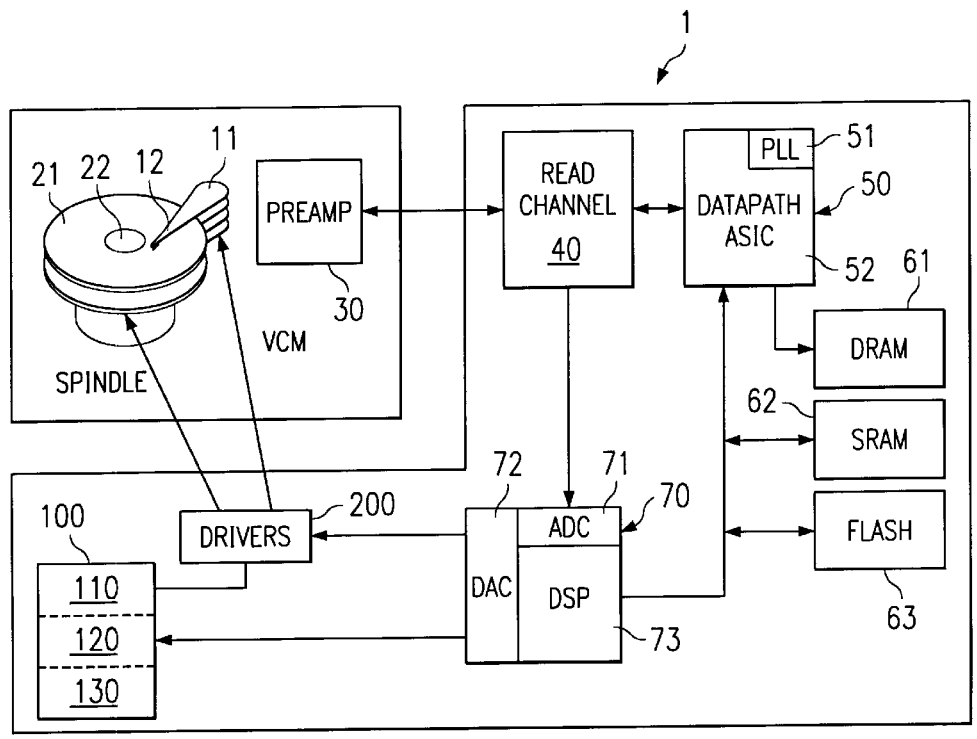
FIG. 1 is an overall block diagram of a hard disk drive system.
Figure 3:
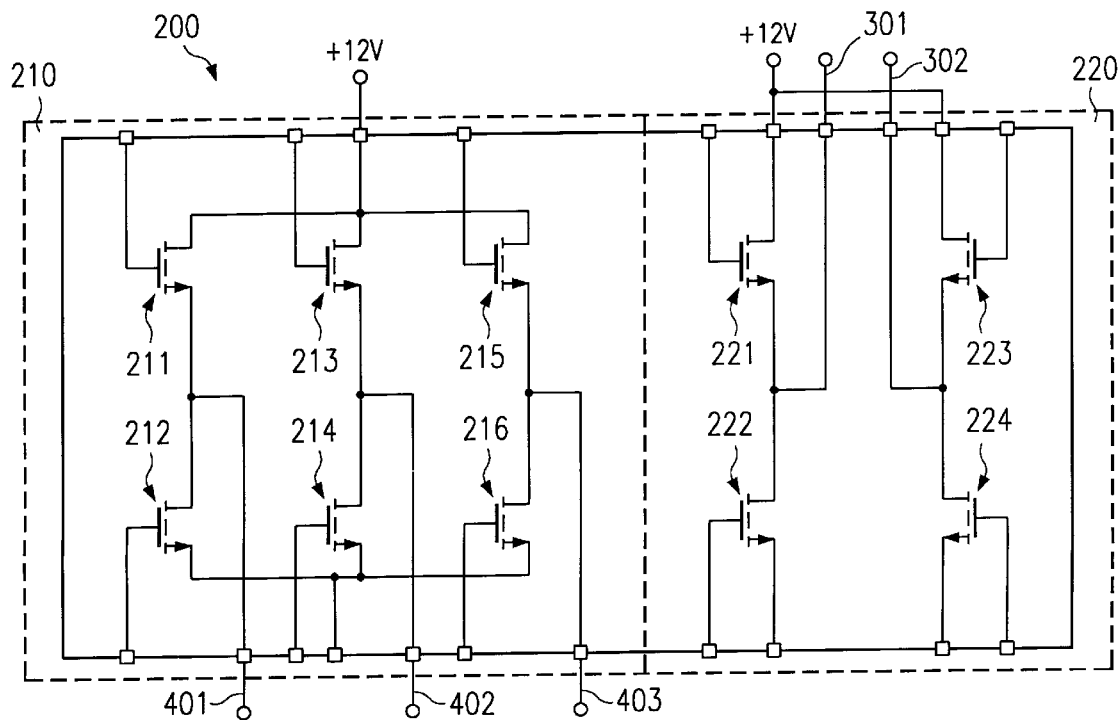
FIG. 3 is a schematic diagram of the actuator and spindle power circuitry in accordance with the invention.
Figure 2:
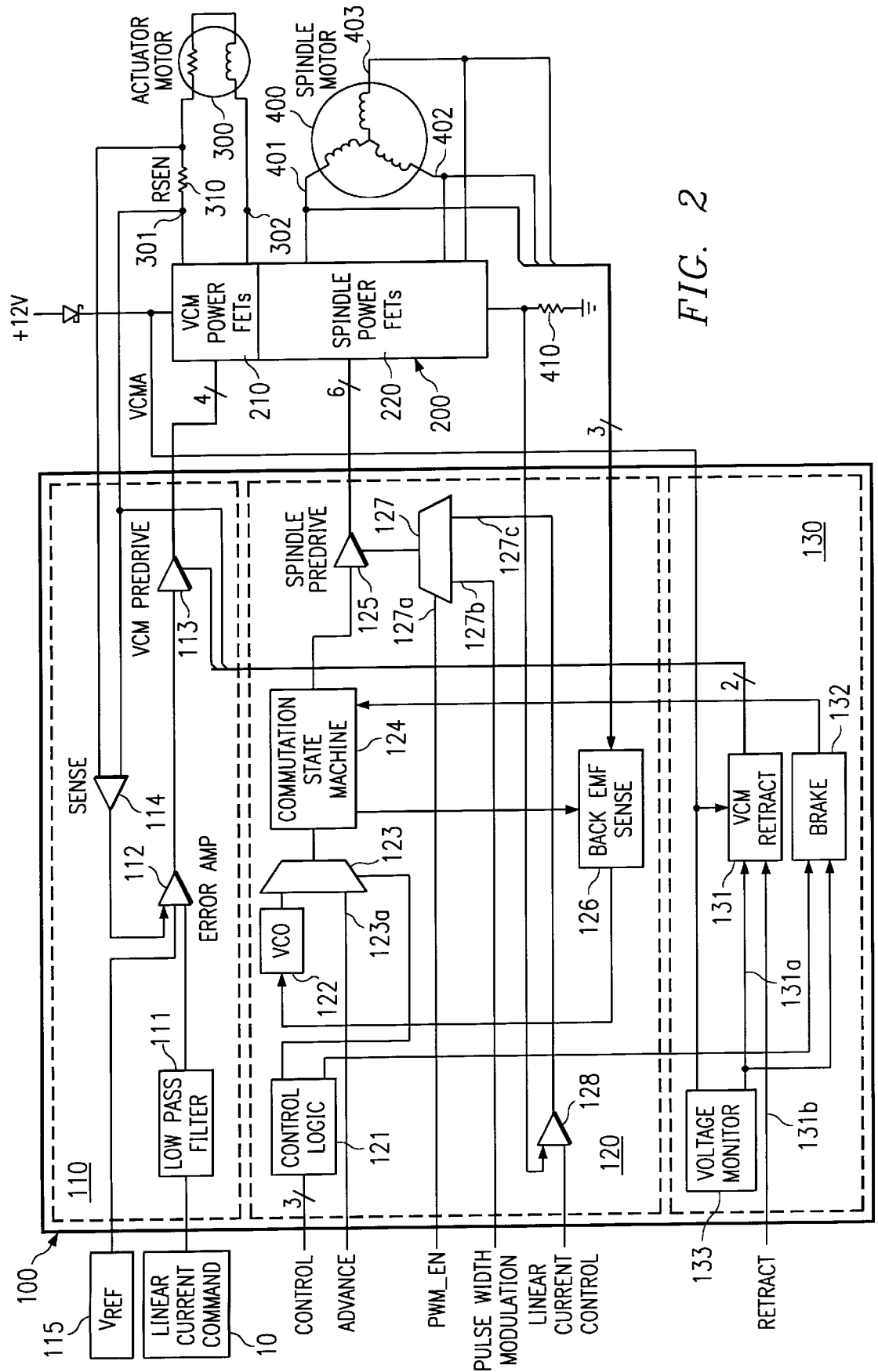
FIG. 2 is a block diagram of the power and control circuitry for hard disk drive actuator and spindle motors in accordance with the invention.

The preferred embodiment of the present invention and its advantages are best understood by referring to FIGS. 1–3 of the drawings, like numerals being used for like and corresponding parts of the various drawings.

Referring to FIG. 1, an overall block diagram of a disk drive in accordance with the invention is shown. Hard disk drive 1 includes a plurality of disks 21 mounted on a rotatable spindle 22. The spindle is rotated by a spindle motor (not shown).

Each disk 21 has magnetic recording surfaces on both sides of the disk. Read heads 12 are mounted on actuator arms 11, which are moved in unison by an actuator motor, also known as a voice coil motor or VCM (not shown). The read heads 12 detect magnetic flux changes on the surfaces of the disks 21. Each flux change produces a signal which is read by a pre-amplifier 30. The pre-amplifier 30 transmits the signal to read channel 40, which decodes and otherwise processes the signal. An example of a function performed by read channel 40 is partial response, maximum likelihood detection using a Viterbi detector.

The read channel 40 sends the decoded data to block 50, which includes a phase-locked loop 51. The phase-locked loop 51 communicates with the read channel 40 to ensure that the data is read from the disk with proper synchronization. Block 50 also includes an application-specific integrated circuit (ASIC) 52, which processes the decoded data and communicates with the read channel 40, dynamic RAM unit 61, static RAM unit 62, flash memory unit 63, and digital signal processing block 73.

Read channel 40 sends the decoded data in analog form to digital signal processing block 70. This block includes an analog-to-digital converter 71, digital signal processing circuitry 73, and a digital-to-analog converter 72. Digital signal processing block 70 sends signals to motor control blocks 110 and 120 on control chip 100 indicating what actions the spindle and actuator motors should take next. Support function block 130 on control chip 100 performs support functions described below.

Referring to FIG. 2, a functional block diagram of the disk drive motor power and control circuitry is shown. Control chip 100 is a bi-CMOS chip which includes actuator control block 110, spindle motor control block 120, and support function block 130.

Power chip 200 is a DMOS chip which includes actuator power block 220 and spindle power block 210, each power block having a plurality of power FETs (shown in FIG. 3). Actuator power block 220 supplies a selected current to the voice coil motor 300, while spindle power block 210 supplies a desired current to spindle motor 400.

Actuator control block 110 includes low pass filter 111, error amplifier 112, actuator motor predrive amplifier 113, and sense amplifier 114. A current control device 10, which may be, for example, a part of digital signal processing block 70, supplies an input voltage representative of the desired actuator current. This voltage is filtered by low pass filter 111. Sense amplifier 114 produces an output signal proportional to the actual current passing through actuator 300 by sensing and amplifying the voltage drop across sense resistor 310.

Error amplifier 112 receives the output of sense amplifier 114 ($V_{SENSE}$), the output of low pass filter 111 ($V_{INPUT}$), and a reference voltage from reference source 115 ($V_{REF}$), which may be generated on control chip 100. Error amplifier 112 takes the difference between the output of sense amplifier 114 and the output of low pass filter 111. This difference voltage is then compared to the reference voltage from reference source 115, and the difference between the two voltages is amplified to produce a target voltage ($V_{TARGET}$). The target voltage is proportional to the difference between the desired and actual actuator currents, with a voltage offset, as follows:

$$V_{TARGET}=c^* (V_{INPUT}-V_{SENSE}-V_{REF}) \quad (1)$$

The target voltage is the desired voltage across actuator motor nodes 301 and 302. This desired driving voltage is attained in a manner to be described below.

Referring to FIG. 3, actuator power block 220 includes FETs 221–224. The gates of FETs 221–224 receive four output signals from actuator motor control block 110, and more specifically from actuator motor predrive amplifier 113. The high side FETs 221 and 223 have drains connected to a high voltage, while the low side FETs 222 and 224 have sources connected to ground. The sources of high side FETs 221 and 223 are connected to the drains of low side FETs 222 and 224, respectively, and to the actuator motor nodes 301 and 302, respectively.

Referring once again to FIG. 2, actuator motor predrive amplifier 113 sends analog output signals to the gates of power FETs 221–224 (shown in FIG. 3), which act as voltage-controlled resistors. During normal operation, actuator motor predrive amplifier 113 turns off one high side FET 221 or 223 and one low side FET 222 or 224. The two FETs turned off are not connected to the same node 301 or 302. Thus, one high side FET will act as a controlled resistance between actuator motor 300 and the voltage source, while one low side FET will act as a controlled resistance between actuator motor 300 and ground. Actuator motor predrive amplifier 113 can therefore control both the direction and magnitude of current flowing through actuator motor 300.

Actuator motor predrive amplifier 113 adjusts the resistances of FETs 221–224 so that the voltage between nodes 301 and 302 equals the target voltage calculated in equation (1) above. Actuator motor predrive amplifier 113 therefore "amplifies" its input voltages indirectly, through manipulation of the gate voltages of FETs 221–224.

Spindle control block 120 includes control logic block 121, voltage controlled oscillator 122, multiplexors 123 and 127, commutation state machine 124, spindle predriver 125, back-EMF sense-and-compare block 126, and summing amplifier 128. Control logic block 121 receives from digital signal processing block 70 a three-bit control input which selects the desired running mode of the spindle motor. Possible selected modes include startup, run, coast, and brake.

In the startup mode, control logic block 121 sends a signal to multiplexor 123 so that commutation state machine 124 is advanced by an external signal from digital signal processing block 70 on input line 123a. In the run mode, control logic block selects multiplexor 123 so that commutation state machine 124 is advanced by a signal from voltage controlled oscillator 122.

As is well understood in the art of disk drive control circuitry, commutation state machine 124 produces six output signals which control high side and low side power FETs for each of the three phase inputs 401–403 of the spindle motor 400. The commutation state machine 124, through spindle predriver 125, switches FETs 211–216 (shown in FIG. 3) in synchronization with the rotation of spindle motor 400 so as to provide the desired torque to spindle motor 400. For example, in the run mode, the desired torque will be in the direction of rotation of spindle motor 400, while in the brake mode the desired torque will be in the opposite direction.

In the run mode, back-EMF sense-and-compare block 126 receives an input signal from nodes 401–403 indicative of the EMF generated on the idle (undriven) one of the spindle motor phase inputs 401–403. This back-EMF signal is compared to the output of the commutation state machine 124 to determine whether the output of the commutation state machine 124 is in the desired phase relationship with the actual rotation of the spindle motor 400.

If the commutation state machine 124 is out of phase with the rotation of the spindle motor 400, then the desired torque will not be applied to the spindle motor 400 and the desired rate of rotation will not be achieved. To correct this situation, the back-EMF sense-and-compare block 126 will increase or decrease its output signal to the voltage controlled oscillator 122 so as to increase or decrease the rate at which the commutation state machine 124 is advanced, thus correcting the phase relationship of the commutation state machine 124 and the rotation of the spindle motor 400.

Referring to FIG. 3, spindle motor power block 210 includes FETs 211–216. The gates of FETs 211–216 receive the six bits of output from spindle motor control block 120. The high side FETS 211, 213, 215 have drains connected to a supply voltage, while the low side FETS 212, 214, 216 have sources connected to ground. The sources of high side FETs 211, 213, 215 are connected to the drains of low side FETs 212, 214, 216, respectively, and to spindle motor input nodes 401–403, respectively. Thus, for example, when high side FET 211 is switched on while low side FET 212 is switched off, the supply voltage will be applied to node 401. Conversely, if FET 211 is off and FET 212 is on, node 401 will be grounded.

Referring once again to FIG. 2, spindle motor 400 is a three-phase motor, as is well understood in the art. To provide torque to the motor, one of the nodes 401–403 must be at a high potential, while another one of the nodes must be grounded. Commutation state machine 124 and spindle predriver 125 switch FETs 211–216 in succession to provide the desired torque to spindle motor 400.

The spindle motor control block 120 can control the current driving the spindle motor 400 by means of either pulse width modulation or linear current control. Multiplexor 127 receives a select input at input port 127a which determines whether pulse width modulation or linear current control is to be used. A pulse width modulation signal is received at input port 127b, while a linear current control signal is received at input port 127c. These signals may be received, for example, from digital signal processing block 70. Multiplexor 127 supplies the input type selected by the select input signal to spindle predriver 125.

When pulse width modulation is selected, the duty cycle of the spindle predriver output is controlled by the duty cycle of the pulse width modulation signal. When the pulse width modulation signal is low, the spindle predriver pulls the gates of low side FETs 212, 214, 216 to ground, thus turning these FETs off. In this state, no current flows through spindle motor 400. When the pulse width modulation signal is high, spindle predriver 125 operates normally and turns on the appropriate low side FET as indicated by commutation state machine 124. Thus, current flows through spindle motor 400 only when the pulse width modulation signal is high.

When linear current control is selected, an analog control signal which is proportional to the desired spindle motor current is received by summing amplifier 128. Sense resistor 410 is connected between the sources of low side FETs 212, 214, 216 and a ground potential. The voltage drop across sense resistor 410 is therefore proportional to the actual current flowing through spindle motor 400. Amplifier 128 subtracts this voltage from the linear current control voltage, and supplies an analog output signal to spindle predriver 125, which applies this voltage to the gate of the low side power FET 212, 214, 216 presently selected by commutation state machine 124. The selected low side power FET will then act as a transconductance amplifier, conducting a drain-source current which is proportional to the output of amplifier 128. The voltage drop across sense resistor 410 will be equal to the linear current command signal when the actual current flowing through spindle motor 400 is equal to the current commanded by amplifier 128.

Support function block 130 contains voltage monitor 133, actuator retract block 131 and spindle brake block 132. Voltage monitor 133 monitors the supply voltage received by the hard disk drive. When the supply voltage drops below a threshold level, voltage monitor 133 sends a fault signal to actuator retract block 131 and spindle brake block 132.

Actuator retract block 131 receives input signals, for example from digital signal processing block 70, indicating when the read head should be retracted to an area of the disk on which data is not stored. This may occur when power to the hard drive is lost, when the supply voltage sags, or when the drive is "parked" by the user for any reason.

When the supply voltage decreases, fast retraction of the read heads is desirable because each read head is literally flying on a cushion of air above its respective disk surface. A read head will "crash" into the disk if the disk rotation rate decreases to a critical level. Therefore, when power to the spindle motor is lost or diminished, the head must be moved to a safe area of the disk where it can "land." To this end, when actuator retract block 131 receives a fault signal from voltage monitor 133 on input port 131a indicating a loss of supply voltage, an output signal is sent to actuator motor predrive amplifier 113 causing fast retraction of the read head.

When a head retract is requested for some non-critical reason, a slower retraction is desirable so as to avoid potential damage to the read heads caused by sudden acceleration. Thus, when a retract signal is received on input port 131b, actuator retract block 131 sends an output signal to actuator motor predrive amplifier 113 causing slow retraction of the read head.

When the hard disk drive is to be shut down, it is desirable to allow the disks to coast freely, gradually slowing their rate of rotation, until a critical speed is reached. At the critical speed, it is desirable to stop the rotation of the disks suddenly, so that when the read heads "land," they need not travel a long distance in contact with the disk surface.

Thus, spindle brake block 132 receives input signals, including the output signal from voltage monitor 133, indicating when the rotation of the spindle motor 400 should be stopped. In response to these signals, spindle brake block 132 sends an output signal to commutation state machine 124 causing it to reverse the direction of the torque applied to spindle motor 400.

The amount of power which must be driven by power chip 200 varies with the power requirements of the actuator and spindle motors used. For each particular combination of actuator and spindle motors selected for a hard disk drive model, a power chip 200 can be designed and manufactured to meet the power requirements of the motors. Thus, a different power chip is required for each combination of motors. However, one advantage of the above-described system is that all power chips designed and constructed in accordance with the invention utilize identical input signals from the control chip 100. Thus, the same generic control chip 100 can be used with any power chip 200 and any combination of disk drive motors 300, 400. This results in considerable cost savings in manufacturing hard disk drive units. Another advantage is that both pulse width modulation and linear current control can be used to control the spindle motor 400.

While the invention has been particularly shown and described by the foregoing detailed description, it will be understood by those skilled in the art that various other changes in form and detail may be made without departing from the spirit and scope of the invention.

What is claimed is:

1. A method for driving hard disk drive spindle and actuator motors, comprising the steps of:
   generating actuator motor control signals at an actuator control circuit formed on a first substrate;
   generating spindle motor control signals at a spindle control circuit formed on the first substrate;
   receiving the actuator motor control signals at an actuator power circuit formed on a second substrate, and generating actuator motor power signals; and
   receiving the spindle motor control signals at a spindle power circuit formed on the second substrate, and generating spindle motor power signals;

wherein the step of generating the actuator motor control signals further comprises the steps of:

sensing at a current meter a current conducted by the actuator motor and generating a sense output signal;

receiving at an error amplifier a linear current command signal and the sense output signal, and generating an amplified error signal; and receiving at an actuator motor predrive amplifier the amplified error signal, and generating the actuator motor control signals.

2. The method of claim 1, wherein the step of generating the spindle motor control signals further comprises the steps of:

receiving at a voltage-controlled oscillator an oscillator control signal and generating an oscillator output signal;

receiving at a commutation state machine the oscillator output signal and generating a plurality of transistor selection signals;

receiving at a spindle predriver the transistor selection signals and generating the spindle motor control signals; and receiving at a phase detector the transistor selection signals and a phase indication signal from the spindle motor, and generating the oscillator control signal.

3. The method of claim 1, wherein the step of receiving the actuator motor control signals and generating the actuator motor power signals further comprises the steps of:

receiving at a gate terminal of a first actuator power transistor a first one of the actuator motor control signals, and providing by the first actuator power transistor a selected resistance between a voltage source and a first input port of the actuator motor;

receiving at a gate terminal of a second actuator power transistor a second one of the actuator motor control signals, and providing by the second actuator power transistor a selected resistance between a ground potential and the first input port of the actuator motor;

receiving at a gate terminal of a third actuator power transistor a third one of the actuator motor control signals, and providing by the third actuator power transistor a selected resistance between the voltage source and a second input port of the actuator motor; and receiving at a gate terminal of a fourth actuator power transistor a fourth one of the actuator motor control signals, and providing by the fourth actuator power transistor a selected resistance between the ground potential and the second input port of the actuator motor.

4. The method of claim 1, wherein the step of receiving the spindle motor control signals and generating the spindle motor power signals further comprises the steps of:

receiving at a gate terminal of a first spindle power transistor a first one of the spindle motor control signals, and providing by the first spindle power transistor a selected resistance between a voltage source and a first input port of the spindle motor;

receiving at a gate terminal of a second spindle power transistor a second one of the spindle motor control signals, and providing by the second spindle power transistor a selected resistance between a ground potential and the first input port of the spindle motor;

receiving at a gate terminal of a third spindle power transistor a third one of the spindle motor control signals, and providing by the third spindle power transistor a selected resistance between the voltage source and a second input port of the spindle motor;

receiving at a gate terminal of a fourth spindle power transistor a fourth one of the spindle motor control signals, and providing by the fourth spindle power transistor a selected resistance between the ground potential and the second input port of the spindle motor;

receiving at a gate terminal of a fifth spindle power transistor a fifth one of the spindle motor control signals, and providing by the fifth spindle power transistor a selected resistance between the voltage source and a third input port of the spindle motor; and receiving at a gate terminal of a sixth spindle power transistor a sixth one of the spindle motor control signals, and providing by the sixth spindle power transistor a selected resistance between the ground potential and the third input port of the spindle motor.

5. The method of claim 1, further comprising the step of receiving at the actuator motor the actuator motor power signals, and positioning by the actuator motor a plurality of read heads in response to the actuator motor power signals.

6. The method of claim 1, further comprising the step of receiving at the spindle motor the spindle motor power signals, and providing by the spindle motor a torque to a hard disk drive spindle in response to the spindle motor power signals.

7. A hard disk drive system comprising:

a spindle motor control circuit formed on a first substrate, for generating a plurality of spindle motor control signals;

a spindle motor power circuit formed on a second substrate, for receiving the spindle motor control signals and for generating a plurality of spindle motor power signals;

an actuator motor control circuit formed on the first substrate, for receiving a linear current command signal and for generating a plurality of actuator motor control signals;

an actuator motor power circuit formed on the second substrate, for receiving the actuator motor control signals and for generating a plurality of actuator motor power signals;

at least one disk attached to a rotatable spindle, the disk having a magnetic medium for storing data;

a spindle motor for receiving and being energized by the spindle motor power signals, and for controlling the rotation of the spindle;

a plurality of disk read heads adjacent to the disks; and an actuator motor for receiving and being energized by the actuator motor power signals, and for controlling the position of the disk read heads;

wherein the actuator motor control circuit comprises:

a sense device for sensing a current conducted by the actuator motor and for generating a sense output signal;

an error amplifier for receiving the linear current command signal and the sense output signal, and for generating an amplified error signal; and an actuator motor predrive amplifier for receiving the amplified error signal and for generating the actuator motor control signals.

8. The hard disk drive system of claim 7, wherein the spindle motor control circuit comprises:

a voltage-controlled oscillator for receiving an oscillator control signal and for generating an oscillator output signal;

a commutation state machine for receiving the oscillator output signal and for generating a plurality of transistor selection signals;

a multiplexor for receiving a mode selection signal, a pulse width modulation signal, and a linear current control signal, for selecting one of the pulse width modulation signal and the linear current control signal in response to the mode selection signal, and for generating an output signal equal to the selected one of the pulse width modulation signal and the linear current control signal;

a spindle predriver for receiving the transistor selection signals and the multiplexor output signal, and for generating the spindle motor control signals; and a phase detector for receiving a phase indication signal from the spindle motor, for receiving the transistor selection signals from the commutation state machine and for generating the oscillator control signal.

9. The hard disk drive system of claim 8, wherein the spindle motor control signals comprise a high side control signal and a low side control signal, the low side control signal being an analog signal proportional to the linear current control signal if the linear current control signal is selected, the low side control signal being a digital signal proportional to the pulse width modulation signal if the pulse width modulation signal is selected.

10. The hard disk drive system of claim 7, wherein the spindle motor power circuit comprises:

a plurality of output conductors, each output conductor being connected to a corresponding input port of the spindle motor, each output conductor conducting a corresponding one of the spindle motor power signals;

a plurality of high side power transistors, each transistor having a gate terminal for receiving a corresponding one of the spindle motor control signals, a drain terminal connected to a voltage source, and a source terminal connected to a corresponding one of the output conductors, each transistor providing a selected resistance between the voltage source and the corresponding output conductor; and a plurality of low side power transistors, each transistor having a gate terminal for receiving a corresponding one of the spindle motor control signals, a source terminal connected to a ground potential, and a drain terminal connected to a corresponding one of the output conductors, each transistor providing a selected resistance between the ground potential and the corresponding output conductor.

11. The hard disk drive system of claim 7 wherein the actuator motor power circuit comprises:

a first output conductor connected to a first input port of the actuator motor, for conducting a first one of the actuator motor power signals;

a first power transistor having a gate terminal for receiving a first one of the actuator motor control signals, a drain terminal connected to a voltage source, and a source terminal connected to the first output conductor, the first power transistor providing a selected resistance between the voltage source and the first output conductor;

a second power transistor having a gate terminal for receiving a second one of the actuator motor control signals, a source terminal connected to a ground potential, and a drain terminal connected to the first output conductor, the second power transistor providing a selected resistance between the ground potential and the first output conductor;

a second output conductor connected to a second input port of the actuator motor, for conducting a second one of the actuator motor power signals;

a third power transistor having a gate terminal for receiving a third one of the actuator motor control signals, a drain terminal connected to the voltage source, and a source terminal connected to the second output conductor, the third power transistor providing a selected resistance between the voltage source and the second output conductor; and a fourth power transistor having a gate terminal for receiving a fourth one of the actuator motor control signals, a source terminal connected to the ground potential, and a drain terminal connected to the second output conductor, the fourth power transistor providing a selected resistance between the ground potential and the second output conductor.

12. The hard disk drive system of claim 7, further comprising:

a voltage monitor, for receiving an input power voltage, for detecting a decrease in the input power voltage, and for generating a fault signal in response to the detected decrease in the input power voltage;

an actuator retract monitor, for receiving the fault signal from the voltage monitor and for supplying an actuator retract signal to the actuator motor control circuit in response to the fault signal; and a spindle brake monitor, for receiving the fault signal from the voltage monitor and for supplying a spindle brake signal to the spindle motor control circuit in response to the fault signal.

13. A system for driving hard disk drive spindle and actuator motors, comprising:

an actuator motor control circuit formed on a first substrate, for generating a plurality of actuator motor control signals;

a spindle motor control circuit formed on the first substrate, for generating a plurality of spindle motor control signals;

an actuator motor power circuit formed on a second substrate, for receiving the actuator motor control signals and for generating and supplying a plurality of actuator motor power signals to the actuator motor; and a spindle motor power circuit formed on the second substrate, for receiving the spindle motor control signals and for generating and supplying a plurality of spindle motor power signals to the spindle motor;

wherein the actuator motor control circuit comprises:

a sense device for sensing a current conducted by the actuator motor and for generating a sense output signal;

an error amplifier for receiving a linear current command signal and the sense output signal, and for generating an amplified error signal; and an actuator motor predrive amplifier for receiving the amplified error signal and for generating the actuator motor control signals.

14. The system of claim 13, wherein the spindle motor control circuit comprises:

a voltage-controlled oscillator for receiving an oscillator control signal and for generating an oscillator output signal;

a commutation state machine for receiving the oscillator output signal and for generating a plurality of transistor selection signals;

a spindle predriver for receiving the transistor selection signals and for generating the spindle motor control signals; and a phase detector for receiving a phase indication signal from the spindle motor, for receiving the transistor selection signals from the commutation state machine and for generating the oscillator control signal.

15. The system of claim 14, wherein the spindle motor control circuit further comprises a multiplexor for receiving a mode selection signal, a pulse width modulation signal, and a linear current control signal, for selecting one of the pulse width modulation signal and the linear current control signal in response to the mode selection signal, and for generating an output signal equal to the selected one of the pulse width modulation signal and the linear current control signal.

16. The system of claim 13, wherein the spindle motor power circuit comprises:

a plurality of output conductors, each output conductor being connected to a corresponding input port of the spindle motor, each output conductor conducting a corresponding one of the spindle motor power signals;

a plurality of high side spindle power transistors, each transistor having a gate terminal for receiving a corresponding one of the spindle motor control signals, a drain terminal connected to a voltage source, and a source terminal connected to a corresponding one of the output conductors, each transistor providing a selected resistance between the voltage source and the corresponding output conductor; and a plurality of low side spindle power transistors, each transistor having a gate terminal for receiving a corresponding one of the spindle motor control signals, a source terminal connected to a ground potential, and a drain terminal connected to a corresponding one of the output conductors, each transistor providing a selected resistance between the ground potential and the corresponding output conductor.

17. The system of claim 13, wherein the actuator motor power circuit comprises:

a plurality of actuator power output conductors, each output conductor being connected to a corresponding input port of the actuator motor, each output conductor conducting a corresponding one of the actuator motor power signals;

a plurality of high side actuator power transistors, each transistor having a gate terminal for receiving a corresponding one of the actuator motor control signals, a drain terminal connected to a voltage source, and a source terminal connected to a corresponding one of the actuator power output conductors, each transistor providing a selected resistance between the voltage source and the corresponding actuator power output conductor; and a plurality of low side actuator power transistors, each transistor having a gate terminal for receiving a corresponding one of the actuator motor control signals, a source terminal connected to a ground potential, and a drain terminal connected to a corresponding one of the actuator power output conductors, each transistor providing a selected resistance between the ground potential and the corresponding actuator power output conductor.

\* \* \* \* \*